Figure 18:
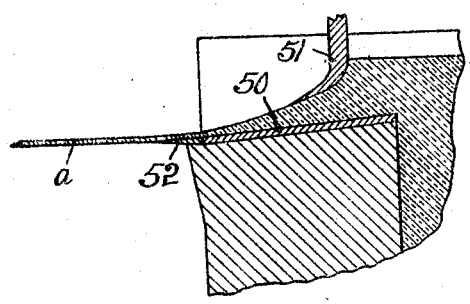

Aug. 4, 1925.
R. M. CORL
1,548,444
MANUFACTURE OF GLASSWARE
Filed Oct. 12, 1922  3 Sheets-Sheet 1
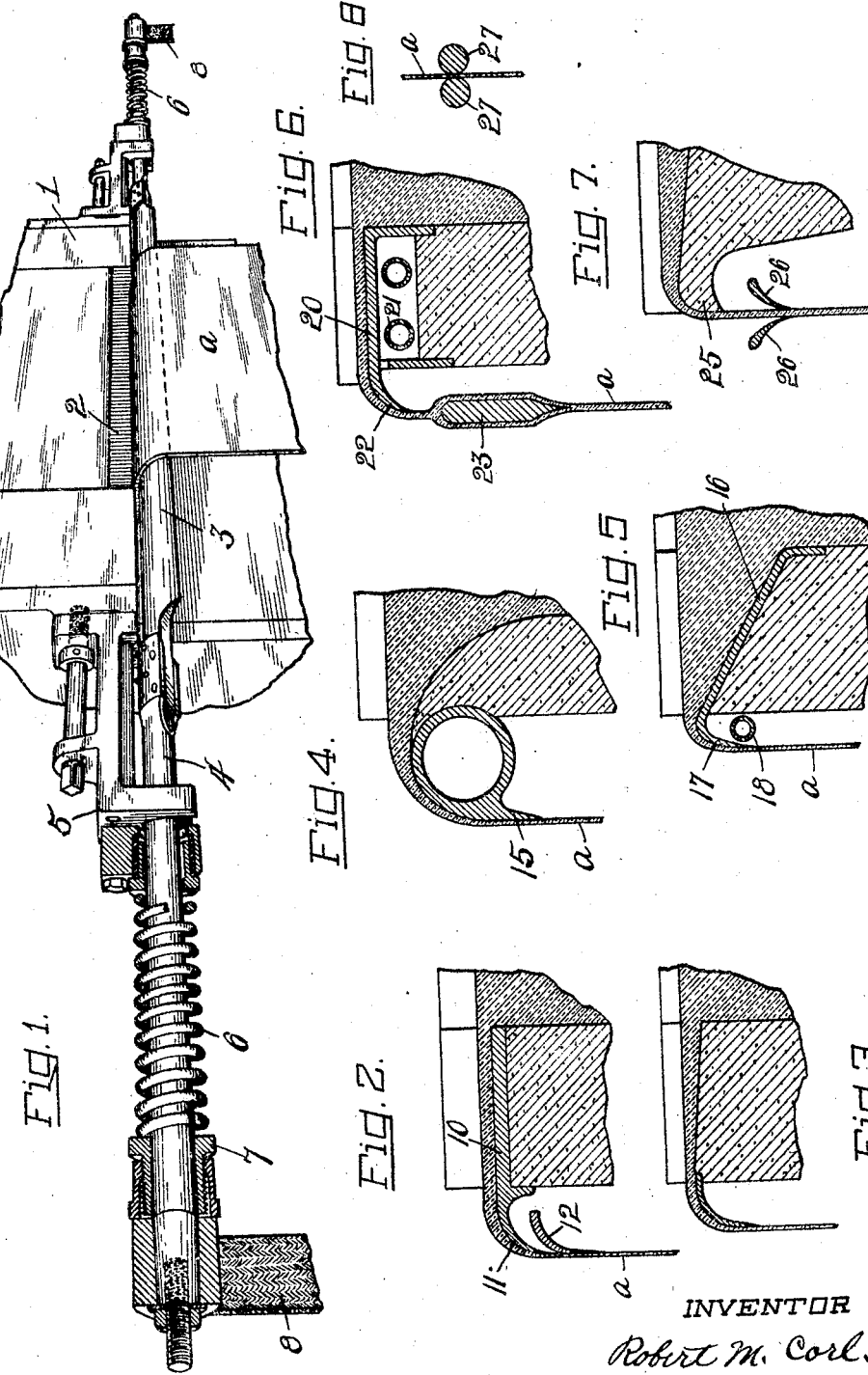
INVENTOR
Robert M. Corl.
By Owen Owen & Crampton
attys.

Aug. 4, 1925.
R. M. CORL
1,548,444
MANUFACTURE OF GLASSWARE
Filed Oct. 12, 1922      3 Sheets-Sheet 2
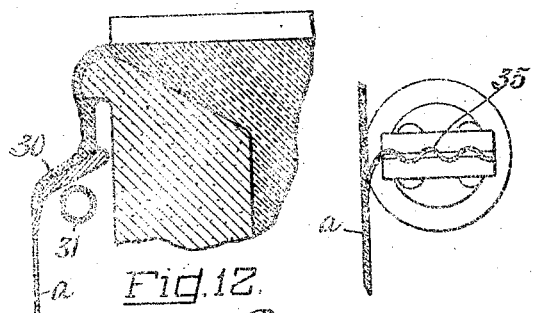
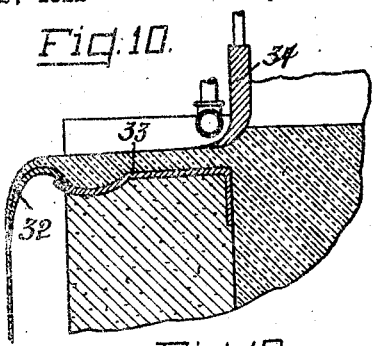
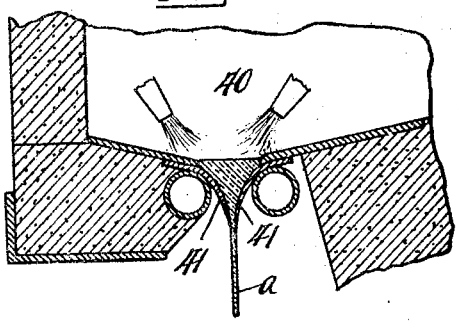
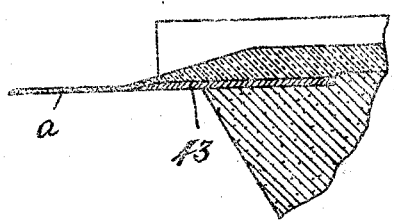
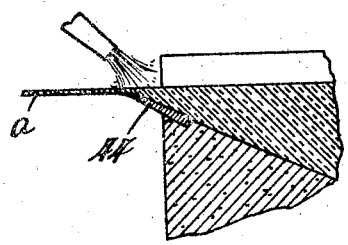
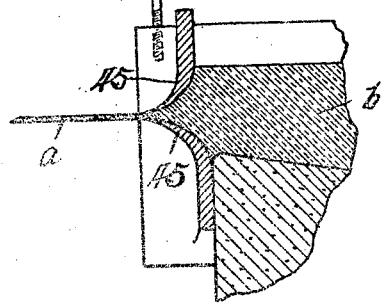
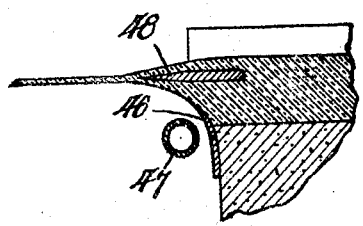
INVENTOR
Robert M. Corl.
By Owen Owen & Crampton.
Attys.

Aug. 4, 1925.

R. M. CORL 1,548,444

MANUFACTURE OF GLASSWARE

Filed Oct. 12, 1922   3 Sheets-Sheet 3

INVENTOR
Robert M. Corl.
By Owen Owen & Crampton
Attys.

Patented Aug. 4, 1925.

1,548,444

UNITED STATES PATENT OFFICE.

ROBERT M. CORL, OF MAUMEE, OHIO, ASSIGNOR TO ERIE GLASS COMPANY, OF TOLEDO, OHIO, A CORPORATION OF DELAWARE.

MANUFACTURE OF GLASSWARE.

Application filed October 12, 1922. Serial No. 593,968.

*To all whom it may concern:*

Be it known that I, ROBERT M. CORL, a citizen of the United States, and a resident of Maumee, in the county of Lucas and State of Ohio, have made an Invention Appertaining to the Manufacture of Glassware; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to the manufacture of glassware and particularly sheet glass wherein glass in a molten state is passed over or through a forming or surface finishing means to impart the finished shape and for its surface formation thereto, and has for its particular object the provision of a forming or finishing means which will produce finished ware free from surface defects, of even thickness, and at high speed and will be easy to control and capable of withstanding the extreme working conditions to which it is subjected.

Practice has proven that the material, shape and temperature of the ware forming means are extremely important in the production of perfect glassware of the class described and that a defect in any one of these may result in defective ware.

In my application Ser. No. 385,391, filed as a continuation of my prior application Ser. No. 272,572, which was filed January 29, 1919, a nickel chromium alloy is referred to as being valuable for use in connection with molten glass working apparatus, as it will withstand for a long period the corrosive, erosive and high heat action of molten glass brought in contact therewith, and also is highly useful as the resistance element of an electric heater for direct heating contact with the glass. While this alloy is preferably used other materials suitable for the purpose, some of which are aluminum, chromium and zirconium may be employed. Porcelain and other suitable refractory materials of a non-metallic nature may also be used, but a metal alloy is preferable as it combines advantages not present in the use of other materials.

The temperature of the forming means assists materially in the rate of flow of the molten glass past the same and also greatly influences the finished surface of the ware. The use of a cold forming means of this character will impart surface defects to the glass and cause it to devitrify and pile up on the forming means, thereby changing the shape of the means and of the ware formed thereby. It is even possible to entirely close a slot in this way. It has been found that the best results are secured when the flowing means, or at least the tip portion thereof is approximately the temperature of the glass where it leaves such means. The hotter the forming means, however, the more free the product will be from surface defects and the more smoothly will the glass flow thereover.

The shape of the forming means more or less controls the flow of the glass past the forming point and is important in securing correct surface finish of the ware and even distribution of glass therein. It is preferable to use a shaping or forming means wherein at least the tip or extreme edge portion thereof is sharp or tapered to a thin edge and is projected in a direction parallel to the line of flow of the glass from the forming means. This prevents one of the greatest causes of surface streaks and defects in the finished ware, as the sharp edge of the forming means from which the glass forflows gives no anchorage to stones and foreign matter in the glass which, on a broad surface tip or edge, especially if cold, would be likely to lodge at the tip and cause a continuous line or streak in the formed sheet. The provision of the sharp tip edge projecting in the direction of the flow of the glass forming means also prevents the glass crawling or spreading laterally from the sheet forming surface along the edge of the forming means and also controls the skin tension, thereby insuring a true, straight anchorage for the ware as it forms.

In order to overcome or counteract the warping tendency of the forming means or the thin tip portion thereof when at least subjected to varying temperature conditions and to thereby maintain a true forming edge for the ware, especially in the forming of sheet glass, the forming means or at least the tip portion thereof is made of a flexible nature and is subjected to a longitudinal pulling stress at its ends sufficient to prevent the warping action.

In the accompanying drawings are illustrated a number of types of forming means and it will be understood that the invention can be used in connection with the forming of molten glass into continuous ware by drawing the same upward or downward or at an angle to a vertical or by flowing the glass downward, and that the shapes illustrated could be readily adapted to exuding or drawing glass tubes or rods as well as cylinders.

In the drawings, Fig. 1 is a perspective fragmentary view of the outlet from a furnace or other source of molten glass supply, including a forming means embodying the invention over and downward from which the glass flows in sheet form, which forming means is disposed in an electric circuit to form an electric heating element and is under longitudinal tension to prevent warping, parts of the device being shown in section. Figs. 2 to 13 are different cross-sectional views of a forming means for a flowing stream of molten glass wherein the formed sheet or ware flows downwardly from the forming or shaping means, and Figs. 14 to 21 are different fragmentary sectional views of forming means for a flowing stream of molten glass wherein the formed sheet or ware is drawn from the forming or shaping means at an angle to a vertical.

Referring to Fig. 1 of the drawings, 1 designates a furnace or other means constituting a source of supply for molten glass and having an outlet opening 2 in a side thereof from which the glass flows over and downward from a discharge lip 3 in the form of a relatively thin sheet $a$. The construction of the means 1 and the manner of directing the flow of glass to the discharge or forming lip 3 forms no part of the present invention and need not therefore be described.

The lip or tip member 3 over which the glass flows constitutes the ware forming means of the invention and is composed of a high heat resisting material, preferably nickel chromium as hereinbefore stated. This lip, in the present instance, is of relatively thin form and is preferably curved in cross-section with its convexed side uppermost so as to change the course of glass flowing thereover from substantially a horizontal plane to a vertical plane. The tip or outer edge portion of the lip 3 terminates in an edge which is directed in a plane parallel to the plane of movement of the sheet $a$ therefrom. The purpose of providing the lip 3 with a thin outer edge which is projected in the direction of flow of the glass therefrom is highly important in preventing the collecting of glass along the lower edge of the lip. If the lip terminated in an edge portion which projected laterally from the point of flow of the glass therefrom, the molten glass would travel back by capillary attraction along such edge and effect a streaking of the inner surface of the sheet $a$ as it flowed from the lip, as is well understood by persons skilled in the art. By terminating the lip in a sharp edge portion the glass is prevented from traveling back on the same and collecting in a devitrified mass at its edge.

The lip plate or tip member 3 is preferably separate from the furnace structure and is placed under longitudinal tension to prevent warping under the high heat conditions to which subjected, thus maintaining a straight discharge edge so that a sheet $a$ of perfect form may be formed from the glass flowing over the lip. For this purpose the lip plate 3 has a stem 4 projecting from each end thereof outwardly from the sides of the furnace 1 or directing means for the flow of the molten glass to the sheet forming point, and each stem slidingly projects outward through a bearing in the outer end of a bracket 5. A tension spring 6 is mounted on each stem 4 without the bearing bracket 5 and has one end-thrust against the bearing and its other end-thrust against a nut or adjusting member 7 by which the tension of the spring may be regulated. It is thus evident that a constant longitudinal tension of desired strength is exerted on the lip plate 3, which is preferably more or less flexible in its nature, and resists any tendency of the plate to warp.

The lip plate 3 is intended to be heated to a temperature at least as high as the temperature of the glass passing thereover in order to prevent adherence of the glass thereto and to cause the glass to flow freely thereover without causing streaks or imperfections on the lip plate contacting side of the finished sheet. It is preferable in practice to heat the lip plate 3 by passing an electric current therethrough, the material of the plate being suitable for the resistance element of an electric heater, as hereinbefore stated. Nickel chromium is a very satisfactory metal for this purpose. 8 designates circuit leads from the stems 4.

In the form of the invention shown in Fig. 2, the glass is shown as flowing from a source of supply over a plate 10 and downward from the thin sharp tip or lip portion 11 thereof which is directed outward and downward in the direction of flow of the sheet $a$ therefrom. The tip portion of the plate 10 may or may not be heated by means separate from the molten glass, and inasmuch as it is a part of the surface plate 10, it is not placed under longitudinal tension as in the case of the lip plate 3 in Fig. 1. A separate plate 12 is provided below the tip 11, being preferably curved and being relatively thin with a sharp lower edge portion in contact with the sheet $a$ shortly after leaving the tip 11 and projected in the direction of movement of the sheet therefrom. The plate 12 in this case is preferably placed under tension the same as the lip plate in Fig. 1, but is not intended to be heated, the intention being to employ such plate to retard the gravity action of a thin sheet flowing from the lip 11 or to serve as a final forming means for the sheet where the glass is too hot to form on the tip 11.

Fig. 3 illustrates a form of lip especially adapted for thin ware and intended to be heated either by the passage of an electric current therethrough or otherwise, and preferably being under tension to prevent warping.

In Fig. 4 the tip member or sheet forming means over which the molten glass flows is shown as being of circular form and hollow to facilitate introduction of a heating means therein and the outer side of the member from which the sheet *a* flows is provided with a tip or lip portion 15, which tapers to a thin or sharp edge and is projected in the direction of travel of the formed ware therefrom.

In Fig. 5 the furnace outlet is provided with an upwardly and outwardly inclined plate 16 over which the glass flows and the outer end or lip portion 17 of this plate is projected outwardly and downwardly from the furnace structure and terminates in a thin sharp edge which is projected in the direction of travel of the sheet *a* therefrom. In this case a gas burner 18 is employed for heating the lip 17, and the lip is not under tension.

In Fig. 6 the glass flows over a surface plate 20, which is heated by burners 21 from below and has a sharp downwardly turned lip portion 22 from which the glass flows onto a forming bar or member 23, the glass passing around and down both sides of the bar in laterally spaced film form and merging in a single sheet *a* as the films flow from the lower sharp edge of the bar. In this case the bar 23 is under tension to prevent any tendency to warp, and, in the production of a thick sheet, need not be heated, whereas in forming a thin sheet it is preferable to heat the bar.

In Fig. 7 the glass flows in sheet form downwardly from the lip portion 25 of a furnace outlet between a pair of spaced gauging strips 26 for surface finishing contact with the sheet after it is formed. The strips 26 are thin and inclined toward each other, and are under tension to prevent warping. They are preferably electrically heated by the passage of an electric current therethrough. This type can be employed with a sheet drawn upward or in any other direction from a molten mass, and its action is independent of the source of the sheet.

In Fig. 8 the sheet *a* after being formed is shown as passing down between a pair of laterally spaced gauging rods or wires 27 for gauging and finishing the sheet surfaces. These rods are of a flexible nature and are intended to be held under tension to prevent warping and are also electrically heated by the passage of a current therethrough.

Fig. 9 illustrates a form in which the mass of glass is preferably segregated from the main mass and afterward formed into a sheet by flowing down onto a forming plate 30, which is preferably inclined with its lower edge terminating in a sharp lip that is projected in the direction of flow of the sheet *a* therefrom. The plate 30 may be disposed at various angles and is preferably heated, a burner 31 being shown in the present instance for this purpose, and may be under tension to prevent warping.

In Fig. 10 the lip plate 32 is separate from the surface plate 33 over which the glass flows and which latter is heated only by the glass. The lip plate 32 is preferably electrically heated, or may be heated in some other suitable manner, and is under tension, thus insuring a correct forming temperature for the lip plate and a perfectly true anchorage for the sheet even though the surface plate 33 may be warped and be below correct forming temperature. The lip plate 32 is of thin form with a sharp outer edge projecting in the direction of flow of the sheet therefrom. The adjustable gate 34, to regulate the depth of the stream of glass flowing over the surface plate 3, is preferably of a high heat resisting material and terminates in a sharp lower edge which is turned outward in the direction of flow of the glass thereby preventing any tendency of the glass to travel up the front side of the gate. The tip portion of the gate is preferably heated to give a surface finish to the outer side of the stream and consequently to the outer or front side of the sheet.

In Fig. 11 a finishing element 35 is shown at one side of a formed sheet *a* for surface finishing contact therewith and is intended to be under tension and preferably constitutes the resistance element of an electric circuit. This element is shown as having a corrugated portion and a downward projected sharp edge lip portion, which latter has contact with the sheet.

In Fig. 12 the molten glass is shown as flowing downward through a bottom slot formed by two opposed members 36, which may be mounted for relative adjustment to vary the width of the opening therebetween and are hollow to facilitate internal temperature control of the same. In order to prevent a portion of the flowing glass from traveling outward along the bottom edges of the members 36 they are provided with downwardly projecting lip portions 37 which terminate in sharp edges projected in the direction of flow of the finished sheet *a* and cooperate to form the finished sheet. The lip portions 37 may be heated to the desired sheet forming temperature by some external heating means, as for instance, wires 38 disposed adjacent thereto and constituting the resistance heating element of an electric circuit. These wires may be under tension.

In Fig. 13 the molten glass flows in a regulated stream into a pit or chamber 40 having a sheet forming discharge outlet in its bottom formed by opposed lip plates 41, which in the present instance, curve inward and downward toward each other and terminate in sharp edges projected in the direction of flow of the sheet *a* therefrom. These plates are preferably under tension to prevent warping and to maintain perfectly true forming edges, and the plates may be heated electrically or in any other suitable manner.

In Fig. 14 the molten glass flows over and is drawn horizontally in sheet form from a plate 43, which is preferably electrically heated and under tension with its outer edge sharp and projecting in the direction of draw of the glass therefrom.

In Fig. 15 the lip plate 44 from which the sheet *a* is horizontally drawn, projects upward and outward and terminates in a sharp edge which is projected in the direction of draw. This plate is under tension and electrically heated and acts as a true edge for the forming sheet.

In Fig. 16 the two lip plates 45 have their adjacent edges terminating in sharp outwardly turned lips and cooperate to form a slot in the front side of the furnace discharge outlet through which the sheet *a* is drawn horizontally. The plates are relatively adjustable to vary the width of the slot and are preferably under tension. The plates are kept at the required temperature by contact with the large mass of molten glass *b* having contact therewith.

In Fig. 17 a lip plate 46, with a sharp edge projecting upward and outward in the direction of flow of the glass, acts as a true edge for the lower surface of the forming sheet and may be heated by a gas burner 47. A distributing plate 48, preferably electrically heated, is submerged in the outwardly flowing glass above the plate 46 and is employed to guide and control the flowing glass, being especially adapted for the forming of thick sheets from a large mass of glass. The plate 48 is preferably under tension to prevent warping.

In Fig. 18 the surface plate 50 and upper plate 51, the latter forming a depth regulating gate for the glass stream, are heated by the mass of glass, and the tip plate 52 at the forward end of the surface plate 50 is preferably heated either electrically or in any other suitable manner and is under tension to prevent warping. The tip portion of the plate 51 and the plate 52 taper to a sharp edge which is projected in the direction of flow of the glass.

Figure 19:
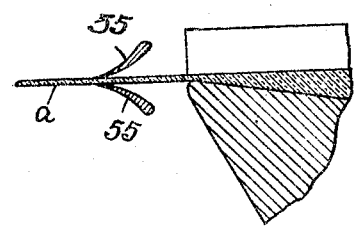

Fig. 19 is the same as Fig. 7 except that the sheet is intended to be drawn horizontally from the furnace outlet and the surface gauging plates 55 are therefore suitably positioned for such purpose. These plates terminate in sharp edges projected in the direction of movement of the sheet and are under tension and intended to be heated.

Figure 20:
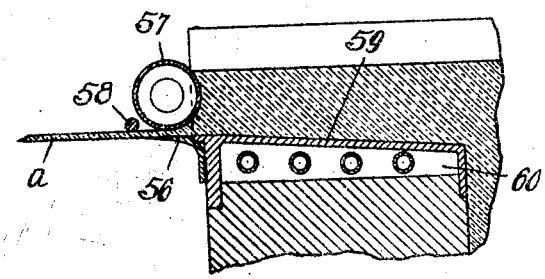

In Fig. 20 the discharge outlet is formed by a lower heated lip-plate 56 and an upper cooling or temperature regulating cylinder 57, which latter is adapted to cool the molten mass the desired extent before it is formed into a sheet by passing through the forming slot and may be revolved if desired. The lip plate 56 terminates in a sharp edge, which is projected in the direction of movement of the sheet, and the heating of the same permits the glass to pass freely thereover without marring the same, while the upper surface of the sheet, after leaving contact with the cooling cylinder 57, is surface finished by an electrically heated tension rod 58. The glass mass before reaching the lip plate 56 passes over a surface plate 59 which is temperature controlled by means in a subjacent chamber 60.

Figure 21:
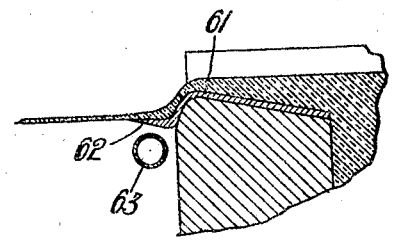

In Fig. 21 the molten glass passes over a surface plate 61 by which it is given a preliminary shape before passing over the lip portion 62 of the plate, which latter is disposed below the body portion 61 of the plate and terminates in a thin sharp edge projecting in the direction of movement of the sheet. The lip portion of the plate is heated by a burner 63.

It is evident that in each of the forms shown, with the exception of Fig. 8, the glass while moving in a formative condition has contact with a ware forming or surface finishing means, which is provided with a thin or sharp edge projecting in the direction of travel of the glass therefrom, thus preventing the glass accumulating at the tip of the forming means; that in some cases the forming means is heated either electrically or otherwise to impart the proper forming or ware finishing temperature thereto, and in some cases the forming means is of a thin or flexible nature and under tension to prevent warping and thereby maintain a true edge for correct forming of the ware.

It will be understood that while I have shown a number of embodiments of the invention, others may be employed without departing from the spirit of the claims.

Having thus described my invention, what I claim as new, and desire to secure by Letters Patent, is,—

1. The method of forming glass in sheet form consisting in moving molten glass past a forming means having a tip portion terminating in a sharp edge projected in the direction of travel of the formed sheet therefrom.

2. The method of forming glass in sheet form consisting in moving molten glass past a heated forming means having a tip portion terminating in a sharp edge projected in the direction of travel of the formed sheet therefrom.

3. The method of forming glassware, which consists in moving glass in contact with the surface of a forming member having the final edge with which the glass is in contact sharpened, and governing the temperature of the member so that the glass will have a tendency to cling thereto.

4. The method of forming glassware, which consists in forming a stream of molten glass into approximately the form of the finished ware and controlling the surface tension of the stream as it leaves the formative point by a metallic knife edge in contact with the surface of the glass and pointing in the direction of movement of the glass.

5. The method of forming glass in sheet form consisting in moving molten glass past a flexible metallic forming means and applying a longitudinal tension to the forming means to prevent warping and to maintain a true forming edge.

6. The method of forming glass in sheet form consisting in moving molten glass past a heated flexible metallic forming means, and maintaining said means under tension to prevent warping.

7. The method of forming glass in sheet form consisting in moving molten glass past a flexible metallic forming means terminating in a sharp tip portion which is projected in the direction of travel of the formed sheet therefrom, and subjecting the forming means to longitudinal tension to prevent warping.

8. The method of forming glass in sheet form, consisting in moving glass in regulated stream form past a heated member having a sharp edge portion in contact with a surface of the glass and projected in the direction of movement thereof.

9. The method of forming glass in sheet form, consisting in moving glass in regulated stream form past a thin flexible heated member having a sharp edge portion in contact with a surface of the glass and projected in the direction of movement thereof, and maintaining said member under tension.

10. In an apparatus of the class described, a member in contact with moving glass while in a condition to cling to the surface of said member, said member having a sharp tip portion projecting in the direction of movement of the glass and in contact therewith.

11. In an apparatus of the class described, a heated member in position to be the final member in contact with moving glass while in a formative condition and having a sharp tip portion projecting in the direction of movement of the glass and in contact therewith.

12. In an apparatus of the class described, a flexible member under longitudinal stretching tension in contact with moving glass while in a formative condition and having a sharp tip portion projecting in the direction of movement of the glass and in contact therewith.

13. In an apparatus of the class described, a thin flexible member terminating in a sharp tip edge in contact with moving glass while in a formative condition and projected in the direction of movement thereof.

14. In an apparatus of the class described, a heated flexible member under longitudinal stretching tension in contact with the moving glass while in a formative condition and having a sharp tip portion projecting in the direction of movement of the glass and in contact therewith.

15. In an apparatus of the class described, a thin heated flexible member terminating in a sharp tip edge in contact with the moving glass while in a formative condition and projected in the direction of movement thereof.

16. In an apparatus of the class described, a flexible member forming the resistance element of an electric circuit and means to apply longitudinal tension to said member in contact with the forming ware.

17. In an apparatus of the class described, a member forming the resistance element of an electric circuit and having a thin tip portion in side contact with a side surface of the forming ware and terminating in a sharp edge projecting in the direction of movement of the ware.

18. In an apparatus of the class described, a member forming the resistance element of an electric circuit and having a thin tip portion in side contact with a side surface of the forming ware and terminating in a sharp edge projecting in the direction of movement of the ware, and means for applying a longitudinal stretching tension to the member to prevent warping.

19. In an apparatus of the class described, a thin metallic lip plate having final contact with a surface of the ware during its formative stage and terminating in a sharp outer edge portion with which the ware has contact and which projects in the direction of movement of the ware.

20. In an apparatus of the class described, a thin metallic lip plate contacting with a surface of the forming ware and terminating in a sharp outer edge portion with which the ware has contact and which projects in the direction of movement of the ware, and means for exerting a longitudinal stretching tension on the lip plate to prevent warping.

21. In an apparatus of the class described, a thin metallic lip plate forming a resistance element of an electric circuit and terminating in a sharp outer edge portion with which the forming ware has contact and which projects in the direction of movement of the ware, and means for exerting a longitudinal stretching tension on the lip plate to prevent warping.

22. In an apparatus of the class described, means forming a discharge slot for molten glass and having forming lips terminating in sharp edges projected in the direction of movement of the formed glass from the slot.

23. In an apparatus of the class described, means forming a discharge slot for molten glass and having thin heated forming lips terminating in sharp edges projected in the direction of movement of the formed glass from the slot.

24. In an apparatus of the class described, means forming a discharge slot for molten glass and having forming lips terminating in sharp edges projected in the direction of movement of the formed glass from the slot and means for exerting a longitudinal stretching tension on the forming lips to prevent warping.

25. In an apparatus of the class described, a pair of opposed thin plate members forming a slot through which glass passes in surface contact therewith, the outer edge portions of the plates being in side contact with the glass and terminating in sharp edges projected in the direction of movement of the glass.

26. In an apparatus of the class described, a pair of opposed thin plate members forming a slot through which glass passes in surface contact therewith, the outer edge portions of the plates being in forming or shaping side contact with the glass and terminating in sharp edges projected in the direction of movement of the glass, and means for placing said plates under longitudinal stretching tension to prevent warping.

27. In an apparatus of the class described, a pair of opposed thin plate members forming a slot through which glass passes in a formative condition in surface contact therewith, the outer edge portions of the plates being in side contact with the glass and terminating in sharp edges projected in the direction of movement of the glass, said plates forming the resistance element of an electric circuit.

28. In an apparatus of the class described, a pair of opposed thin plate members forming a slot through which glass passes in a formative condition in surface contact therewith, the outer edge portions of the plates being in side contact with the glass and terminating in sharp edges projected in the direction of movement of the glass, and means for heating the plates.

29. In an apparatus of the class described, a stationary member over which molten glass flows to a sheet forming point and flexible means under longitudinal stretching tension in sheet forming contact with the glass after leaving the said member.

30. In an apparatus of the class described, means over which molten glass flows to a sheet forming point, and a heated sheet forming means capable of movements relative to the first means and terminating in a sharp outer edge portion from which the sheet flows and which is projected in the direction of movement of the sheet, and means for applying tension to the forming means to prevent warping.

31. In an apparatus for forming sheet glass wherein a stream of molten glass flows past a sheet forming point, a means contacting with the glass substantially at such point and having a sharp edge portion from which the glass flows in sheet form projected in the direction of movement of the glass.

32. In an apparatus for forming sheet glass wherein a stream of molten glass flows past a sheet forming point, a flexible member contacting with the glass substantially at such point and having a sharp edge portion from which the glass flows in sheet form projected in the direction of movement of the sheet, and means for applying longitudinal tension to the member to prevent warping.

33. In an apparatus for forming sheet glass wherein a stream of molten glass flows past a sheet forming point, a means contacting with the glass substantially at such point and having a sharp edge portion from which the glass flows in sheet form projected in the direction of movement of the glass, and means for heating the first means to a temperature at least as high as that of the glass contacting therewith.

34. In an apparatus for forming sheet glass wherein a stream of molten glass flows past a sheet forming point, a flexible member contacting with the glass substantially at such point and having a sharp edge portion from which the glass flows in sheet form projected in the direction of movement of the sheet, means for applying longitudinal tension to the member to prevent warping, and means for heating the member to a temperature at least as high as that of the glass contacting therewith.

35. In an apparatus of the class described, a chromium alloy member in contact with moving glass while in a formative condition, the member having a sharp tip portion projected in the direction of movement of the glass and in contact therewith.

36. In an apparatus of the class described, a flexible member of chromium alloy in contact with moving glass while in a formative condition, the member having a sharp tip portion projected in the direction of movement of the glass and in contact therewith, and means for applying longitudinal tension to the member to maintain a true forming edge.

37. In an apparatus of the class described, a chromium alloy member forming the resistance element of an electric circuit and in contact with moving glass while in a formative condition, the member having a sharp tip projected in the direction of movement of the glass and in contact therewith.

38. In an apparatus of the class described, a thin, flexible member of chromium alloy in formative contact with moving glass while the latter is in a formative condition, the member forming the resistance heating element of an electric circuit and having a sharp tip portion projecting in the direction of movement of the glass and from which the glass passes, and means for placing the member under longitudinal tension to maintain a true forming edge.

39. In an apparatus of the class described, a thin chromium alloy member in formative contact with moving glass while the latter is in a formative condition, and means exerting a continual longitudinal tension on the member to prevent warping.

40. In an apparatus for forming sheet glass, means to hold a supply of glass from which the glass sheet is formed, a chromium alloy member in contact with the glass while in a formative condition and while moving from said means, said member terminating in a thin portion having a sharp edge projected in the direction of movement of the glass and from which edge the glass passes.

In testimony whereof, I have hereunto signed my name to this specification.

ROBERT M. CORL.